(12) United States Patent
Izumida et al.

(10) Patent No.: US 11,837,043 B2
(45) Date of Patent: Dec. 5, 2023

(54) BANKNOTE MONITORING APPARATUS, BANKNOTE MONITORING SYSTEM, AND BANKNOTE MONITORING METHOD

(71) Applicant: Glory Ltd., Himeji (JP)

(72) Inventors: Tsuyoshi Izumida, Hyogo (JP);
Keisuke Nada, Hyogo (JP)

(73) Assignee: GLORY LTD., Himeji (JP)

( * ) Notice: Subject to any disclaimer, the term of this patent is extended or adjusted under 35 U.S.C. 154(b) by 456 days.

(21) Appl. No.: 17/210,535

(22) Filed: Mar. 24, 2021

(65) Prior Publication Data

US 2021/0225111 A1 Jul. 22, 2021

Related U.S. Application Data

(63) Continuation of application No. PCT/JP2019/035109, filed on Sep. 6, 2019.

(30) Foreign Application Priority Data

Sep. 28, 2018 (JP) .................. 2018-185340

(51) Int. Cl.
*G06K 9/00* (2022.01)
*G07D 7/00* (2016.01)
*G07D 7/128* (2016.01)
*G07F 19/00* (2006.01)

(52) U.S. Cl.
CPC ............ *G07D 7/003* (2017.05); *G07D 7/128* (2013.01); *G07F 19/206* (2013.01); *G07D 2207/00* (2013.01)

(58) Field of Classification Search
None
See application file for complete search history.

(56) References Cited

U.S. PATENT DOCUMENTS

| | | | |
|---|---|---|---|
| 9,406,184 B2* | 8/2016 | Chae ................. | G07D 7/206 |
| 2010/0202680 A1* | 8/2010 | Hamasaki .......... | G07D 7/0047 |
| | | | 382/137 |
| 2012/0243056 A1* | 9/2012 | Yamaguchi ......... | G07D 11/32 |
| | | | 382/137 |
| 2020/0035056 A1* | 1/2020 | Miyashita ............. | G07D 9/00 |
| 2020/0126341 A1* | 4/2020 | Miyashita ........... | G07D 11/34 |

FOREIGN PATENT DOCUMENTS

| | | |
|---|---|---|
| JP | 2012-14539 A | 1/2012 |
| JP | 2012-174132 A | 9/2012 |
| JP | 2013-205909 A | 10/2013 |
| JP | 2015-18463 A | 1/2015 |
| JP | 2015-156050 A | 8/2015 |
| JP | 2016-18497 A | 2/2016 |
| JP | 2017-194836 A | 10/2017 |

OTHER PUBLICATIONS

International Search Report and Written Opinion dated Oct. 8, 2019, received for PCT Application PCT/JP2019/035109, Filed on Sep. 6, 2019, 9 pages including English Translation.

* cited by examiner

*Primary Examiner* — Soo Jin Park
(74) *Attorney, Agent, or Firm* — XSENSUS LLP

(57) ABSTRACT

A banknote monitoring apparatus includes a reception section that receives information including a serial number from each of a plurality of banknote processing apparatuses processing a banknote with the serial number; and a control section that determines whether a specification of the banknote has been changed based on an identification rate of the serial number obtainable with the information received.

13 Claims, 8 Drawing Sheets

FIG. 8

| Parameters | Trends seen in big data | Possibilities |
|---|---|---|
| Area | Deteriorating trend of the identification rate for particular denominations in particular areas<br><br>Characteristics of the particular areas:<br>1. Around a bank of issue for XXX<br>2. Within the area influenced by CIT (companies A, B, and C)<br>3. Area of low-income class | · Silent revision (material change, ink change, font change etc.)<br>· Difference in selection criteria for refilling notes for each CIT<br>· Influence of a change of affiliated CITs of mega banks<br>· Problem of particular denominations<br>(A handling amount of large denomination notes may increase in areas of a low-income class due to the difficulty of making credit cards.) |
| Apparatus model | The deteriorating trends differ between models respectively mounted recognition of XXX type and YYY type having different serial number identificaiton algorithms.<br>(the deteriorating trend increases for YYY type.) | · Lot failure of YYY type recognition<br>· Hardware failure of YYY type recognition<br>· Failure in the serial number identification algorithms of YYY type recognition<br>· Template failure of YYY type recognition<br>· Software failure in a YYY type recognition control section of the apparatus<br>· Caused by the difference in the identification algorithms of XXX type and YYY type |
| Version | No significant difference is caused by each apparatus, a hardware version, or a software version, as a result of comparison for each apparatus model. | · Low possibilities of lot failure, hardware failure, failure in the serial number identification algorithm, and template failure etc. |
| Transaction | The deteriorating trend increases for refilled notes compared with deposited notes since brand-new banknotes come to the market after coming into banks. | · Silent revision (Since brank-new banknotes come to the market after coming into banks, deposits (count of banknotes from general customers) receive little influence.) |
| Client | The deteriorating trend increases at particular clients. | · Influence of the apparatus (the model or the version) installed at the client<br>· Phenomenon occurring only for the operation form of the client |
| Operation form | The deteriorating trend increases for apparatuses not in residual operation compared with apparatuses in residual operation. | · Influence of collection frequency (all collected daily after business for apparatuses not in residual operation)<br>· Influence of refilling frequency (refiled daily before business for apparatuses not in residual operation) |
| | The deteriorating trend decreases in amusement facilities. | · Problem of particular denominations<br>(A handling amount of large denomination notes increases in amusement facilities such as casinos.) |
| Time range | The deteriorating trend increases in time ranges before and after business. | · Influence of operations before and after business (e.g., refilling, collection, and reconciliation)<br>· Influence of temperature or humidity in the time range (no direct influence of the time range) |
| Temperature / Humidity | No significant difference but the deteriorating trend slightly increases in the time range of lower temperature. | · Influence of sensor characteristics by the temperature<br>· Influence of the period (no direct influence of the temperature)<br>· Influence of the time range (no direct influence of the temperature) |
| Period | The deteriorating trend starts from around a particular month. | · Template failure (failure in the template updated in the particular period)<br>· Particular types / models (failure in the type or model released or revised in the particular period)<br>· Failure in particular lots (failure in the lot shipped in the particular period)<br>· Silent revision (revised in the particular period) |
| | Occurred only for the year | · Low possibility of the influence of seasonal changes |
| Phenomenon transition | Characteristics of each parameter had been seen for one or two months. The characteristics got less distinctive and settled in a generally deteriorated state after the third month. | · Silent revision (the characteristics got less distinctive after a few months, which means that revised notes had gone on the market)<br>· Temperature difference depending on seasonal changes |

BANKNOTE MONITORING APPARATUS, BANKNOTE MONITORING SYSTEM, AND BANKNOTE MONITORING METHOD

CROSS REFERENCE TO RELATED APPLICATIONS

The present application is based on PCT filing PCT/JP2019/035109, filed on Sep. 6, 2019, which claims priority to JP 2018-185340, filed Sep. 28, 2018, the entire contents of each are incorporated herein by reference.

TECHNICAL FIELD

The present disclosure relates to a banknote monitoring apparatus, a banknote monitoring system, and a banknote monitoring method.

BACKGROUND ART

Patent Literature (hereinafter, referred to as "PTL") 1 discloses a sheet processing system capable of determining the authenticity with high accuracy without being affected by variations in printing or paper quality of sheets, for example. In PTL 1, an Automatic Teller Machine (ATM) transmits a feature amount of a banknote to a host computer in reading the feature of the banknote. The host computer determines whether the banknote is registered in a database in receiving the feature amount of the banknote. When the banknote is registered in the database, the host computer determines a determination value based on the feature amount of the banknote registered in the database, and transmits the determination value to the ATM. The ATM determines the authenticity of the banknote using the determination value received from the host computer.

CITATION LIST

Patent Literature

PTL 1
Japanese Patent Application Laid-Open No. 2012-14539

SUMMARY

A banknote monitoring apparatus according to the first aspect of the present disclosure includes; a reception section that receives information including a serial number from each of a plurality of banknote processing apparatuses processing a banknote with the serial number; and a control section that determines whether a specification of the banknote has been changed based on an identification rate of the serial number obtainable with the information received.

A banknote monitoring system according to the second aspect of the present disclosure includes; a plurality of banknote processing apparatuses that process a banknote with a serial number; and a banknote monitoring apparatus comprising a reception section that receives information including the serial number from each of the plurality of banknote processing apparatuses, and a control section that determines whether a specification of the banknote has been changed based on an identification rate of the serial number obtainable with the information received by the reception section.

A banknote monitoring method according to the third aspect of the present disclosure includes; receiving information including a serial number from each of a plurality of banknote processing apparatuses processing a banknote with the serial number; and determining whether a specification of the banknote has been changed based on an identification rate of the serial number obtainable with the information received.

BRIEF DESCRIPTION OF DRAWINGS

FIG. 8 is a chart for describing examples of trends in information in each parameter, and analysis results interpreted from the trends in the information.

DESCRIPTION OF EMBODIMENTS

In PTL 1, ATMs determine banknotes using determination values previously stored in a host computer, and cannot appropriately determine, in some cases, the authenticity of the banknotes when, for example, a specification of the banknotes, such as a font of a serial number of the banknote, is changed. Thus, technology to detect the specification change of the banknotes has been desired to be developed.

The present disclosure aims to provide a banknote monitoring apparatus, a banknote monitoring system, and a banknote monitoring method each making it possible to detect a specification change of a banknote.

According to the present disclosure, it is possible to detect a specification change of a banknote.

An embodiment of the present disclosure will be described in detail below with reference to the accompanying drawings.

Figure 1:
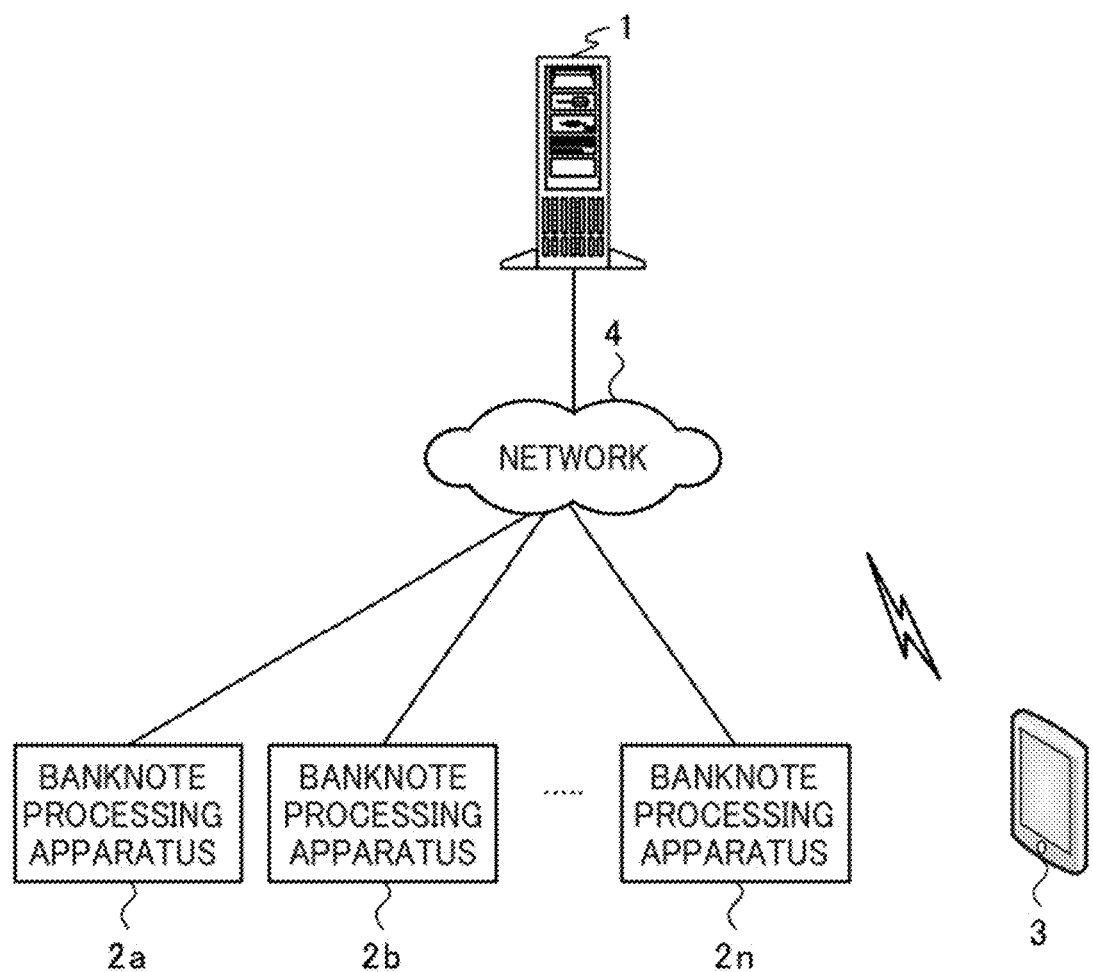
FIG. 1 illustrates an exemplary banknote monitoring system according to an embodiment of the present disclosure.

FIG. 1 illustrates an exemplary banknote monitoring system according to the embodiment of the present disclosure. As illustrated in FIG. 1, the banknote monitoring system comprises a banknote monitoring apparatus 1, banknote processing apparatuses 2a to 2n, and a terminal device 3. Note that a network 4 is illustrated in FIG. 1. The network 4 is a network including, for example, a radio communication network for mobile phones, the internet and the like.

The banknote monitoring apparatus 1 is, for example, an information processing apparatus such as a cloud server. The banknote monitoring apparatus 1 may be configured with a plurality of information processing apparatuses. The banknote monitoring apparatus 1 is connected to the network 4 by wire, for example. The banknote monitoring apparatus 1 provides a banknote monitoring service to the terminal device 3 connected to the network 4. Note that the banknote monitoring service will be described later in detail.

The banknote processing apparatuses 2a to 2n are, for example, apparatuses that perform depositing processing and withdrawal processing such as Teller Cash Recyclers (TCRs) and ATMs. The banknote processing apparatuses 2a to 2n may also be, for example, banknote sorting machines that sort banknotes based on a predetermined condition. The banknote processing apparatuses 2a to 2n may have the same format, or may have different formats from each other.

The banknote processing apparatuses 2a to 2n are installed in facilities such as banks and retail stores, for example. The banknote processing apparatuses 2a to 2n read, for example, a serial number of a banknote to be deposited. When reading the serial number of the banknote, the banknote processing apparatuses 2a to 2n calculate an identification rate of the serial number. The banknote processing apparatuses 2a to 2n transmit the calculated identification rates or an average value of the calculated identification rates to the banknote monitoring apparatus 1 via the network 4.

The identification rate of the serial number is a rate of the number of digits, read by the apparatus, of the serial number to the number of digits of the serial number given to the banknote. For example, when the number of digits of the serial number given to the banknote is 10, and the banknote processing apparatuses 2a to 2n can read 8 digits among the 10 digits of the serial number, the identification rate of the serial number is 80%. Note that determination whether the serial number is read will be described later.

The banknote monitoring apparatus 1 determines whether a specification of the banknote has been changed by the identification rates or the average value of the identification rates of the serial numbers of the banknotes transmitted from the banknote processing apparatuses 2a to 2n. This determination method will be described later in detail. When determining that the specification of the banknote has been changed, the banknote monitoring apparatus 1 transmits specification change notification indicating that the specification of the banknote has been changed, to the terminal device 3. Such a service to transmit the specification change notification to the terminal device 3 when the specification of the banknote has been changed is called a banknote monitoring service.

The specification of the banknote includes, for example, a font of the serial number of the banknote, a design of the banknote, a material of the banknote, or an ink material. In addition, the specification change of the banknote includes, for example, at least one change, by a revision of the banknote, of the font of the serial number, a part of the design of the banknote, the material of the banknote, and the ink material. Note that the identification rate of the serial number in the banknote processing apparatuses 2a to 2n is usually lowered when the specification of the banknote has been changed.

The terminal device 3 is, for example, a mobile terminal such as a tablet terminal and a smartphone. The terminal device 3 may also be a terminal device such as a laptop personal computer (PC) and a PC. The terminal device 3 is connected to the network 4 by radio or wire, for example.

The terminal device 3 is registered with the banknote monitoring service. The terminal device 3 registered with the banknote monitoring service can receive the specification change notification from the banknote monitoring apparatus 1 when the specification of the banknote has been changed.

The terminal device 3 is owned by, for example, a user who manufactures, maintains, or manages the banknote processing apparatuses 2a to 2n. The user who owns the terminal device 3 can be aware that the specification of the banknote has been changed when the terminal device 3 receives the specification change notification from the banknote monitoring apparatus 1.

The user who has been aware that the specification of the banknote has been changed, can update determination information for the banknote processing apparatuses 2a to 2n. The determination information is information used for, for example, determining the authenticity of the banknote by the banknote processing apparatuses 2a to 2n. The determination information includes an algorithm for determining, for example, the authenticity of the banknote, a threshold to be compared with information (sensor values) from the banknote read by various sensors, or an image data of the banknote, for example. The determination information may be referred to as a template or a reference, for example.

A description will be given of an outline of an exemplary operation in a banknote processing system in FIG. 1. The banknote processing apparatuses 2a to 2n read the serial number of the banknote to be deposited. When reading the serial number, the banknote processing apparatuses 2a to 2n calculate the identification rate of the serial number. The banknote processing apparatuses 2a to 2n record the calculated identification rate in a memory section, for example.

The banknote processing apparatuses 2a to 2n calculate, at a predetermined time once a day, for example, the average value of the identification rates for a day (hereinafter, may be referred to as an "average identification rate") recorded in the memory section. The banknote processing apparatuses 2a to 2n transmit the calculated average identification rate to the banknote monitoring apparatus 1.

The banknote monitoring apparatus 1 determines whether the specification of the banknote has been changed by the average identification rate of the serial number transmitted from the banknote processing apparatuses 2a to 2n. Detail of the determination will be described below with reference to FIG. 2.

Figure 2:
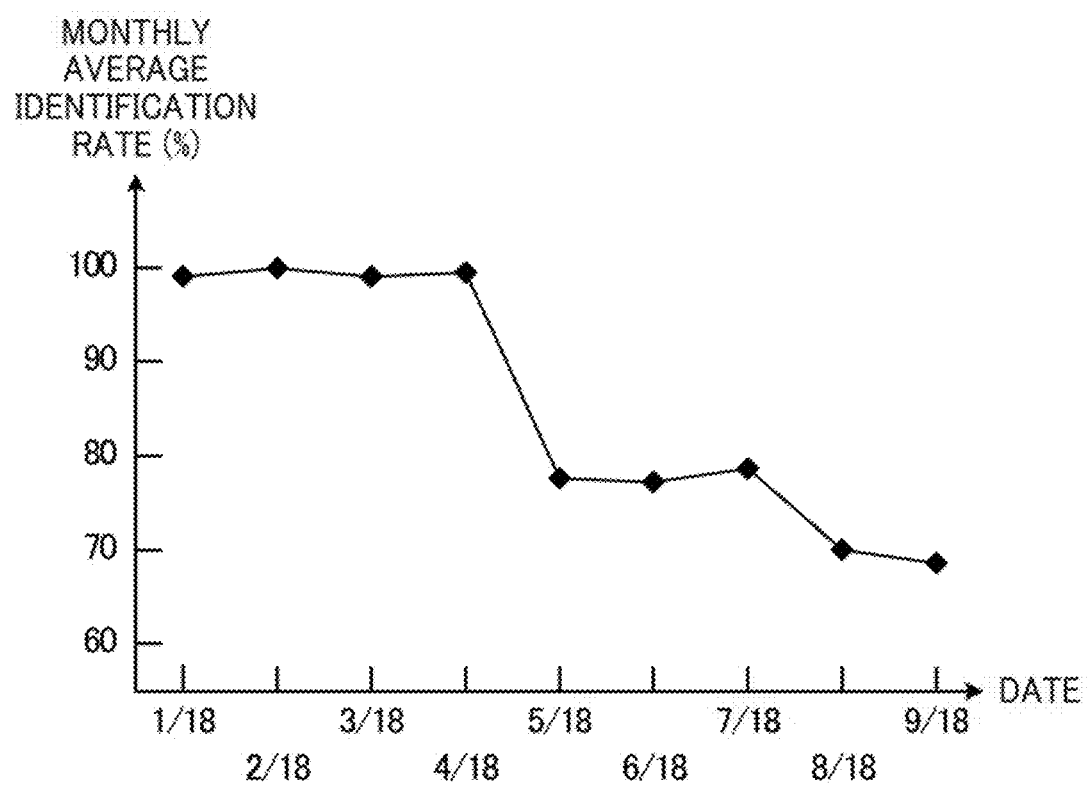
FIG. 2 is a diagram for describing an exemplary determination operation of a specification change of a banknote in a banknote monitoring apparatus.

FIG. 2 is a diagram for describing an exemplary determination operation of the specification change of the banknote in the banknote monitoring apparatus 1. The banknote monitoring apparatus 1 records the average identification rate of the serial number transmitted from the banknote processing apparatuses 2a to 2n, in a memory section.

The banknote monitoring apparatus 1 calculates, on a predetermined date and time once a month, for example, the average identification rate for a month (hereinafter, may be referred to as a "monthly average identification rate") of the average identification rates recorded in the memory section 13 illustrated in FIG. 4. In FIG. 2 for example, the banknote monitoring apparatus 1 calculates the monthly average identification rate of the banknote processing apparatuses 2a to 2n as a whole, on the 18th every month. Calculating the average identification rate for a month enables to reduce an influence of noise by unfit notes, for example, thereby improving the accuracy of determining the specification change of the banknote.

The banknote monitoring apparatus 1 determines whether the specification of the banknote has been changed by the calculated monthly average identification rate. For example, the banknote monitoring apparatus 1 obtains the average value of the identification rates for a predetermined period (here, for a month), which is the monthly average identification rate, and determines that the specification of the banknote has been changed when an absolute value of a variation of the monthly average identification rates is greater than a predetermined threshold. To be more specific, the banknote monitoring apparatus 1 calculates, per month, the variation of the monthly average identification rates, and determines that the specification of the banknote has been changed when the absolute value of the calculated variation is greater than 20%. In the example of FIG. 2, the absolute value of the variation of the monthly average identification rates is greater than 20% for a month from April 18th to May 18th. Thus, the banknote monitoring apparatus 1 determines on May 18th that the specification of the banknote has been changed.

Going back to the description of the outline of the exemplary operation in FIG. 1, the banknote monitoring apparatus 1 transmits the specification change notification to the terminal device 3 when determining that the specification of the banknote has been changed. In the case of FIG. 2, the banknote monitoring apparatus 1 determines on May 18th that the specification of the banknote has been changed, and transmits the specification change notification to the terminal device 3 on May 18th or later at least.

The banknote monitoring apparatus 1 transmits the specification change notification to the terminal device 3 by email, for example. Note that the banknote monitoring apparatus 1 records, in the memory section, information such as an email address of the terminal device 3 to which the banknote monitoring apparatus 1 transmits the specification change notification.

As described above, the banknote monitoring apparatus 1 receives the average identification rates of the serial numbers of the banknotes from the banknote processing apparatuses 2a to 2n. The banknote monitoring apparatus 1 then calculates the monthly average identification rate from the average identification rates received from the banknote processing apparatuses 2a to 2n. This enables the banknote monitoring apparatus 1 to detect, from the calculated monthly average identification rate, that the specification of the banknote has been changed. For example, as described above, the banknote monitoring apparatus 1 calculates the variation of the monthly average identification rates from the last month, and determines that the specification of the banknote has been changed when the absolute value of the calculated variation is greater than a predetermined threshold.

Further, the banknote monitoring apparatus 1 transmits the specification change notification to the terminal device 3, so that a user who has been aware that the specification of the banknote has been changed, can update the determination information for the banknote processing apparatuses 2a to 2n.

Note that the banknote processing apparatuses 2a to 2n have been described as apparatuses performing the depositing processing and the withdrawal processing, but the present embodiment is not limited to this. The banknote processing apparatuses 2a to 2n may perform either the depositing processing or the withdrawal processing.

In addition, the banknote processing apparatuses 2a to 2n in the present embodiment read the serial number of the banknote to be deposited, and calculate the identification rate of the read serial number, but are not limited to operate this way. The banknote processing apparatuses 2a to 2n may also read the serial number of the banknote to be withdrawn, and calculate the identification rate of the read serial number. Further, the banknote processing apparatuses 2a to 2n may read the serial number of the banknote to be either deposited or withdrawn, and calculate the identification rate of the read serial number.

Furthermore, the banknote processing apparatuses 2a to 2n in the present embodiment calculate the average identification rate of the identification rates for a day at a predetermined time once a day, and transmit the average identification rate to the banknote monitoring apparatus 1, but are not limited to operate this way. The banknote processing apparatuses 2a to 2n may calculate the average value of the identification rates in a predetermined cycle, and transmit the average value to the banknote monitoring apparatus 1. The banknote processing apparatuses 2a to 2n may also each calculate the average value of the identification rates in different cycles from each other, and transmit the average value to the banknote monitoring apparatus 1.

Additionally, the banknote monitoring apparatus 1 in the present embodiment calculates, on a predetermined date and time once a month, the average identification rate for a month of the average identification rates recorded in the memory section 13, and determines whether the specification of the banknote has been changed, but is not limited to operate this way. The banknote monitoring apparatus 1 may calculate, in a predetermined cycle, the average value of the average identification rates recorded in the memory section 13, and determine whether the specification of the banknote has been changed.

Further, the terminal device 3 is not limited to a single device and may include 2 or more devices. The banknote processing apparatuses 2a to 2n may also be manufactured, maintained, or managed (hereinafter, may simply referred to as "managed") by different users. The banknote processing apparatuses 2a to 2n may also be installed in different countries. The banknote monitoring apparatus 1 may provide different users in different countries with the banknote monitoring service corresponding to the banknotes of the respective countries.

Figure 3:
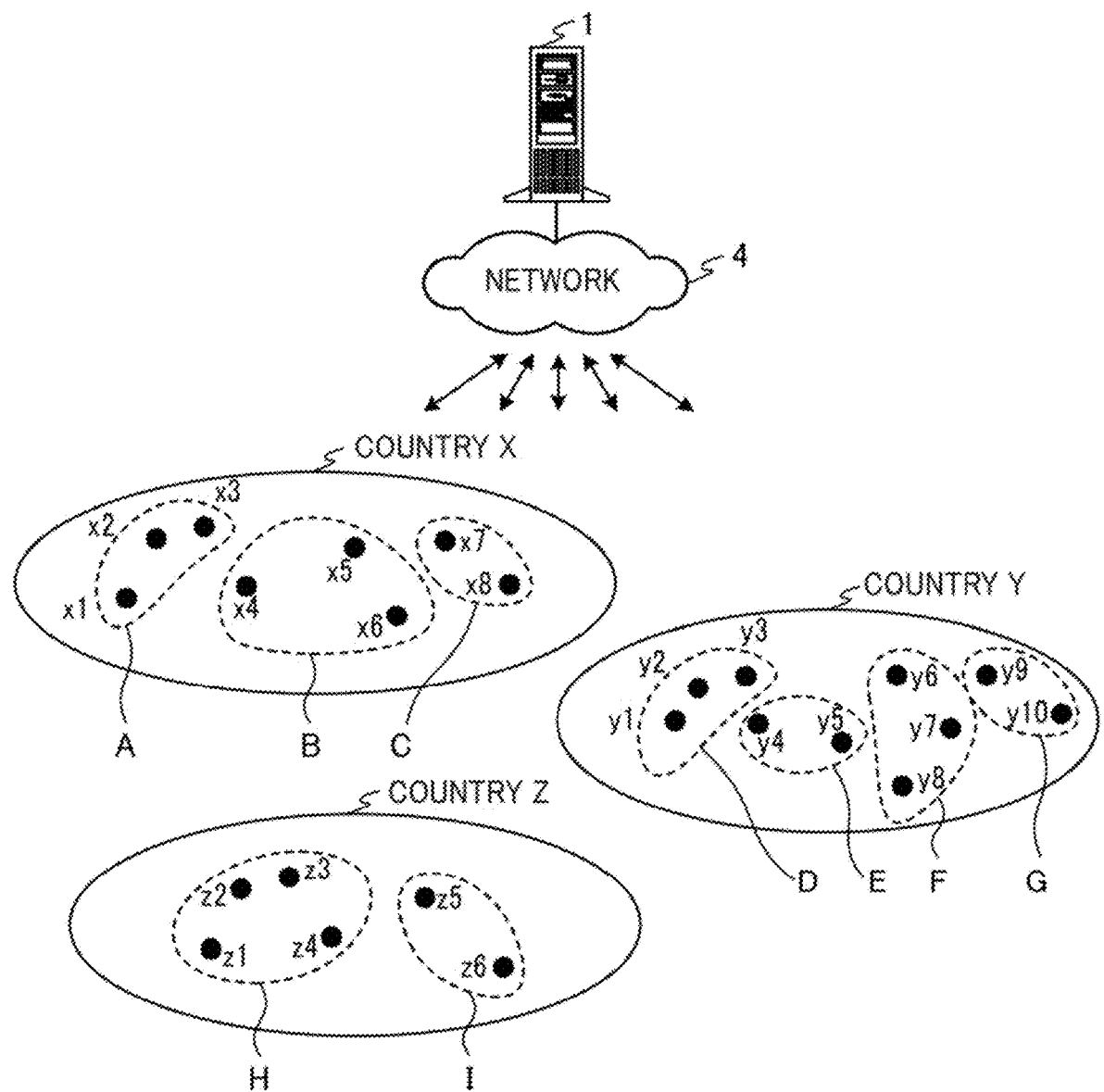
FIG. 3 illustrates an exemplary banknote monitoring service.

FIG. 3 illustrates an exemplary banknote monitoring service. Banknote processing apparatuses x1 to x8, y1 to y10, and z1 to z6 marked as black dots in FIG. 3 correspond to the banknote processing apparatuses 2a to 2n illustrated in FIG. 1. The banknote processing apparatuses x1 to x8 are installed in a country X. The banknote processing apparatuses y1 to y10 are installed in a country Y. The banknote processing apparatuses z1 to z6 are installed in a country Z.

FIG. 3 includes the banknote monitoring apparatus 1 illustrated in FIG. 1. The banknote monitoring apparatus 1 communicates via the network 4 with the banknote processing apparatuses x1 to x8, y1 to y10, and z1 to z6 installed in respective countries.

The banknote processing apparatuses x1 to x3 in the country X are managed by a user A. The banknote processing apparatuses x1 to x3 may be installed in the same facility or in different facilities. The banknote processing apparatuses x4 to x6 in the country X are managed by a user B. The banknote processing apparatuses x4 to x6 may be installed in the same facility or in different facilities. The banknote processing apparatuses x7 and x8 in the country X are managed by a user C. The banknote processing apparatuses x7 and x8 may be installed in the same facility or in different facilities. The users A to C are registered with a banknote monitoring service of the banknote monitoring apparatus 1.

The banknote processing apparatuses y1 to y3 in the country Y are managed by a user D. The banknote processing apparatuses y1 to y3 may be installed in the same facility or in different facilities. The banknote processing apparatuses y4 and y5 in the country Y are managed by a user E. The banknote processing apparatuses y4 and y5 may be installed in the same facility or in different facilities. The banknote processing apparatuses y6 to y8 in the country Y are managed by a user F. The banknote processing apparatuses y6 to y8 may be installed in the same facility or in different facilities. The banknote processing apparatuses y9 and y10 in the country Y are managed by a user G The banknote processing apparatuses y9 and y10 may be installed in the same facility or in different facilities. The users D to G are registered with the banknote monitoring service of the banknote monitoring apparatus 1.

The banknote processing apparatuses z1 to z4 in the country Z are managed by a user H. The banknote processing apparatuses z1 to z4 may be installed in the same facility or in different facilities. The banknote processing apparatuses z5 and z6 in the country Z are managed by a user I. The banknote processing apparatuses z5 and z6 may be installed in the same facility or in different facilities. The users H and I are registered with the banknote monitoring service of the banknote monitoring apparatus 1.

The banknote is different for each country. Thus, the banknote monitoring apparatus 1 determines whether the specification of the banknote of each country has been changed, based on the average identification rates received from the banknote processing apparatuses in each country. The banknote monitoring apparatus 1 then transmits the specification change notification to the terminal devices owned by users in each country.

For example, the banknote monitoring apparatus 1 determines whether the specification of the banknote of the country X has been changed, based on the average identification rates received from the banknote processing apparatuses x1 to x8 installed in the country X. When determining that the specification of the banknote of the country X has been changed, the banknote monitoring apparatus 1 transmits the specification change notification to the terminal devices owned by the users A to C in the country X registered with the banknote monitoring service.

In addition, the banknote monitoring apparatus 1 determines whether the specification of the banknote of the country Y has been changed, based on the average identification rates received from the banknote processing apparatuses y1 to y10 installed in the country Y. When determining that the specification of the banknote of the country Y has been changed, the banknote monitoring apparatus 1 transmits the specification change notification to the terminal devices owned by the users D to G in the country Y registered with the banknote monitoring service.

Further, the banknote monitoring apparatus 1 determines whether the specification of the banknote of the country Z has been changed, based on the average identification rates received from the banknote processing apparatuses z1 to z6 installed in the country Z. When determining that the specification of the banknote of the country Z has been changed, the banknote monitoring apparatus 1 transmits the specification change notification to the terminal devices owned by the users H and I in the country Z registered with the banknote monitoring service.

As described above, the banknote monitoring apparatus 1 receives (collects) the average identification rates from the banknote processing apparatuses managed by different users, and determines whether the specification of the banknote has been changed. For the country X for example, the banknote monitoring apparatus 1 receives the average identification rates from the banknote processing apparatuses x1 to x8 managed by the different users A to C, and determines whether the specification of the banknote of the country X has been changed. This enables the banknote monitoring apparatus 1 to collect more of the average identification rates, thereby improving the accuracy of determining the specification change of the banknote.

Further, the banknote monitoring apparatus 1 receives, for each country, the average identification rates from the banknote processing apparatuses, and determines, for each country, whether the specification of the banknote has been changed. This enables the banknote monitoring apparatus 1 to provide users in various countries with the notification service of the specification change of the respective banknotes.

Figure 4:
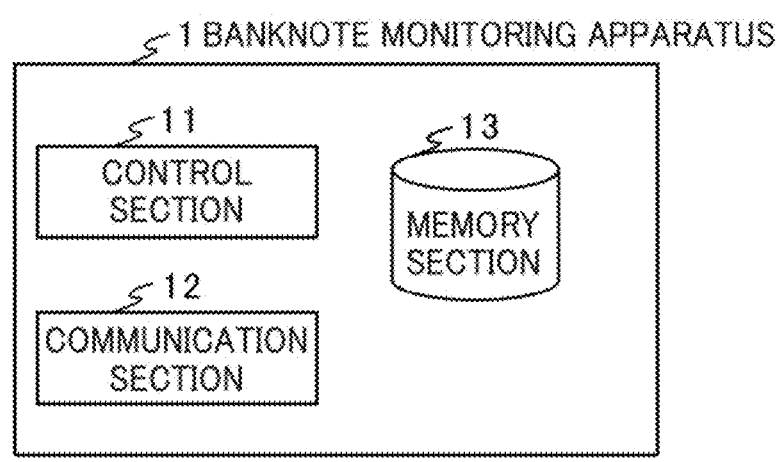
FIG. 4 illustrates an exemplary block configuration of the banknote monitoring apparatus.

FIG. 4 illustrates an exemplary block configuration of the banknote monitoring apparatus 1. As illustrated in FIG. 4, the banknote monitoring apparatus 1 comprises a control section 11, a communication section 12, and the memory section 13.

The control section 11 entirely controls the banknote monitoring apparatus 1. The control section 11 may be composed of a Central Processing Unit (CPU), for example.

The communication section 12 communicates with the banknote processing apparatuses 2a to 2n via the network 4. The communication section 12 also communicates with the terminal device 3 via the network 4.

The memory section 13 records a program for operating the control section 11. The memory section 13 also records data for calculation processing of the control section 11 or data for operating each section. The memory section 13 may be composed of a memory device such as a Random Access Memory (RAM), a Read Only Memory (ROM), a flash memory, or a Hard Disk Drive (HDD).

Figure 5:
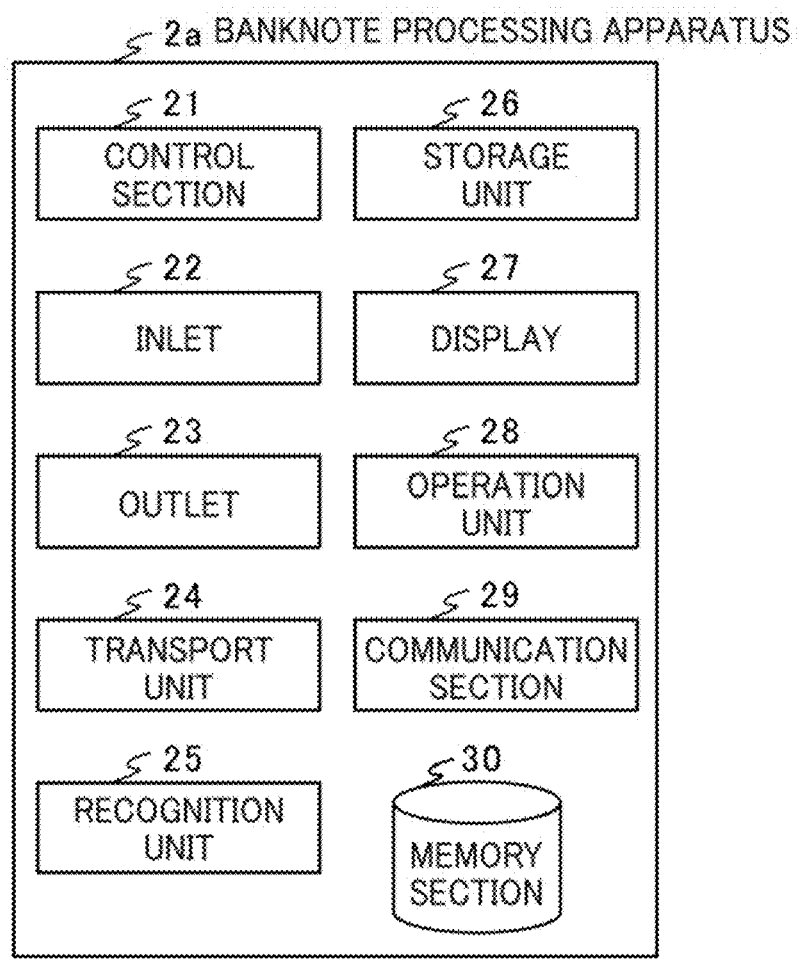
FIG. 5 illustrates an exemplary block configuration of a banknote processing apparatus.

FIG. 5 illustrates an exemplary block configuration of the banknote processing apparatus 2a. As illustrated in FIG. 5, the banknote processing apparatus 2a comprises a control section 21, an inlet 22, an outlet 23, a transport unit 24, a recognition unit 25, a storage unit 26, a display 27, an operation unit 28, a communication section 29, and the memory section 30.

The control section 21 entirely controls the banknote processing apparatus 2a. The control section 21 may be composed of a CPU, for example.

The inlet 22 takes in banknotes inputted from bank clerks or customers, for example. The inlet 22 feeds out the inputted banknotes to the transport unit 24.

The outlet 23 stacks the banknotes transported by the transport unit 24. The bank clerks or customers can take out, from the outlet 23, the banknotes stacked in the outlet 23.

The transport unit 24 transports the banknotes fed into the inlet 22 to the storage unit 26, based on the control of the control section 21. The transport unit 24 also transports the banknotes fed out from the storage unit 26 to the outlet 23, based on the control of the control section 21.

The recognition unit 25 is provided around the transport unit 24. The recognition unit 25 comprises various sensors (not illustrated), and recognizes, for example, the denominations, the authenticity, the face/back, the fitness, and whether new or old of the banknotes transported by the transport unit 24. For example, the recognition unit 25 recognizes the denominations, the authenticity, the face/back, the fitness, and whether new or old of the banknotes transported by the transport unit 24, by comparing information read with the various sensors to the determination information recorded in the memory section 30. The banknotes transported by the transport unit 24 are transported to the storage unit 26 corresponding to the denominations of the banknotes, based on the recognition result of the recognition unit 25, for example.

The recognition unit 25 comprises a reading sensor for reading the serial number of the banknote as one of the various sensors. For example, the recognition unit 25 comprises Optical Character Recognition (OCR). The recognition unit 25 compares, for example, a character (including a number) in each digit of the serial number read by the OCR with the determination information recorded in the memory section 30, and determines whether the character in each digit of the serial number is identified.

To be more specific, the recognition unit 25 determines that a certain digit of the serial number is identified when a matching rate between the character in the certain digit of the serial number read by the OCR and a dictionary (a character) included in the determination information exceeds a predetermined threshold (e.g., 70%). Meanwhile, the recognition unit 25 determines that a certain digit of the serial number is not successfully identified (hereinafter, may be referred to as "unidentified") when the matching rate between the character in the certain digit of the serial number read by the OCR and the dictionary in the determination information does not exceed a predetermined threshold. The recognition unit 25 determines for all digits of the serial number whether the respective characters are identified, and then outputs the identification result to the control section 21. The control section 21 calculates the identification rate of the serial number (the rate of the number of read digits of the serial number to the number of digits of the serial number) based on the identification result of the serial number obtained from the recognition unit 25.

Note that the recognition unit 25 still performs the recognition processing of the denominations, the authenticity, the face/back, the fitness, and whether new or old of the banknotes transported by the transport unit 24, when the characters of the serial number of the banknote are unidentified.

The storage unit 26 stores the banknotes transported by the transport unit 24 for each denomination, for example. The storage unit 26 also feeds out the stored banknotes to the transport unit 24 based on the control of the control section 21.

The display 27 displays an image based on digital image data outputted from the control section 21. The display 27 is, for example, a liquid crystal display.

The operation unit 28 receives operations of the bank clerks or customers, for example. The operation unit 28 outputs information corresponding to the received operation to the control section 21. The operation unit 28 is, for example, a touchscreen superimposed onto the display 27. The operation unit 28 may also be a key input device, for example.

The communication section 29 communicates with the banknote monitoring apparatus 1 via the network 4.

The memory section 30 records a program for operating the control section 21. The memory section 30 also records data for calculation processing of the control section 21 or data for operating each section. The memory section 30 may be composed of a memory device such as a RAM, a ROM, a flash memory, or an HDD.

FIG. 5 illustrates the exemplary block configuration of the banknote processing apparatus 2a, but the banknote processing apparatuses 2b to 2n comprise the similar blocks to those of the banknote processing apparatus 2a.

Figure 6:
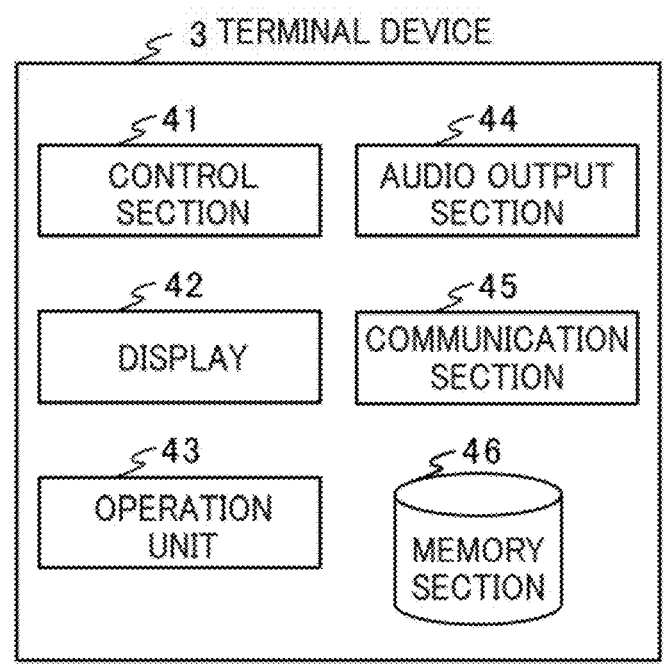
FIG. 6 illustrates an exemplary block configuration of a terminal device.

FIG. 6 illustrates an exemplary block configuration of the terminal device 3. As illustrated in FIG. 6, the terminal device 3 comprises a control section 41, a display 42, an operation unit 43, an audio output section 44, a communication section 45, and a memory section 46.

The control section 41 entirely controls the terminal device 3. The control section 41 may be composed of a CPU, for example.

The display 42 displays an image based on digital image data outputted from the control section 41. The display 42 is, for example, a liquid crystal display.

The operation unit 43 receives operations of a user being an owner of the terminal device 3, for example. The operation unit 43 outputs information corresponding to the received operation to the control section 41. The operation unit 43 is, for example, a touchscreen superimposed onto the display 42. The operation unit 43 may also be a key input device, for example.

The audio output section 44 outputs audio based on digital audio data outputted from the control section 41. The audio output section 44 is, for example, a speaker.

The communication section 45 communicates with the banknote monitoring apparatus 1 via the network 4.

The memory section 46 records a program for operating the control section 41. The memory section 46 also records data for calculation processing of the control section 41 or data for operating each section. The memory section 46 may be composed of a memory device such as a RAM, a ROM, a flash memory, or an HDD.

Figure 7:
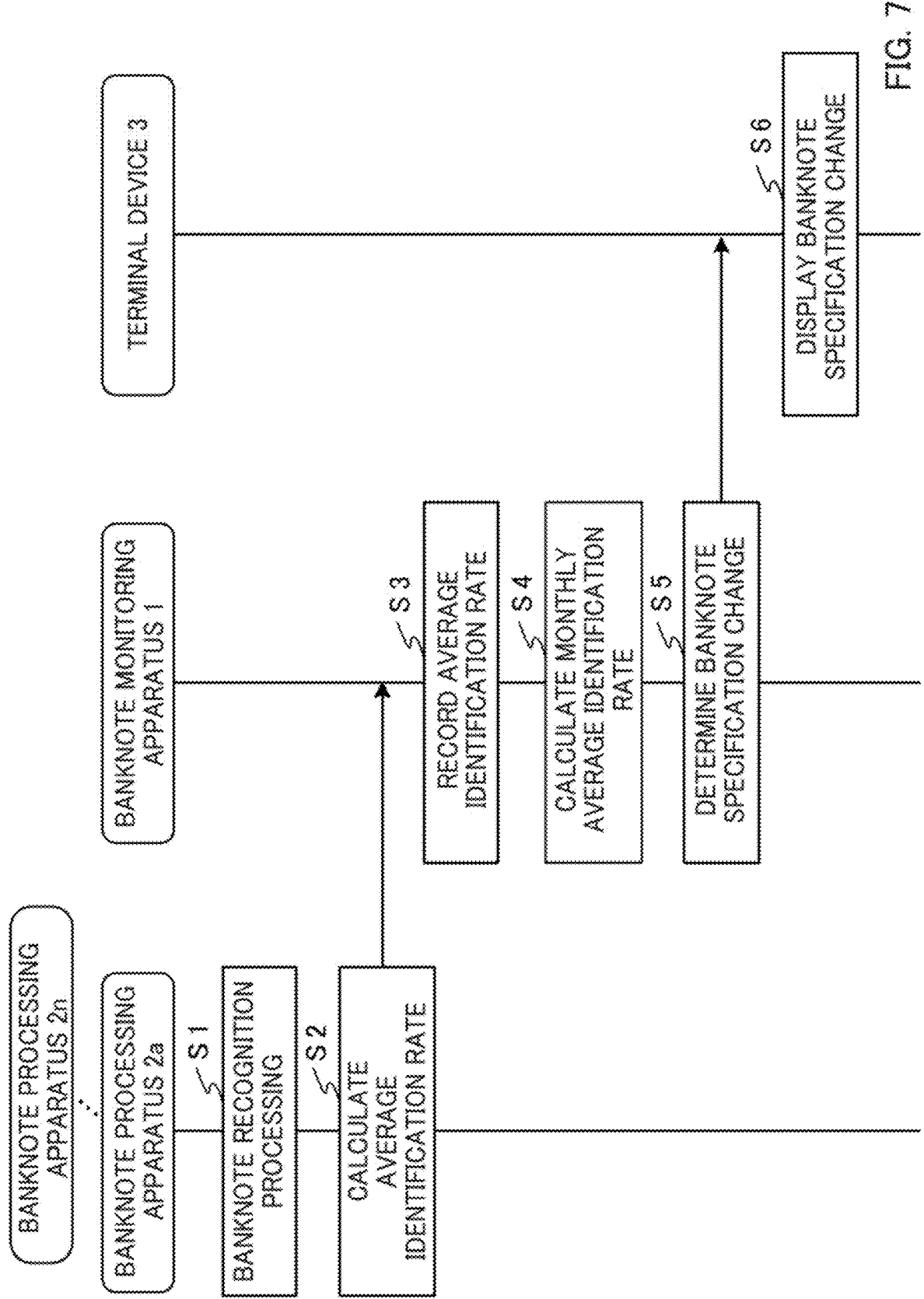
FIG. 7 is a sequence diagram illustrating an exemplary operation of the banknote monitoring system.

FIG. 7 is a sequence diagram illustrating an exemplary operation of the banknote monitoring system. The recognition units 25 of the banknote processing apparatuses 2a to 2n perform the recognition processing on deposited banknotes (Step S1). For example, the recognition units 25 of the banknote processing apparatuses 2a to 2n recognize the denominations, the inputted orientation, the fitness, the authenticity, and the serial numbers, for example, of the deposited banknotes, based on the determination information recorded in the memory sections 30. The recognition units 25 of the banknote processing apparatuses 2a to 2n output the identification results of the serial numbers to the control sections 21 when performing the recognition processing of the banknotes.

The control sections 21 of the banknote processing apparatuses 2a to 2n calculate the average identification rates based on the identification results of the serial numbers outputted from the recognition units 25 (Step S2). For example, the control sections 21 of the banknote processing apparatuses 2a to 2n calculate the identification rates of the serial numbers based on the identification results of the serial numbers, and record the identification rates in the memory section 30. The control sections 21 then calculate the average identification rates for a day at a predetermined time once a day, based on the identification rates recorded in the memory section 30. The communication sections 29 of the banknote processing apparatuses 2a to 2n transmit the average identification rates calculated by the control sections 21 to the banknote monitoring apparatus 1.

When the communication section 12 of the banknote monitoring apparatus 1 receives the average identification rates transmitted from the banknote processing apparatuses 2a to 2n, the control section 11 of the banknote monitoring apparatus 1 records, in the memory section 13, the average identification rates received by the communication section 12 (Step S3).

The control section 11 of the banknote monitoring apparatus 1 calculates the monthly average identification rate of the banknote processing apparatuses 2a to 2n based on the average identification rates recorded in the memory section 13 (Step S4). For example, the control section 11 of the banknote monitoring apparatus 1 calculates, at a predetermined time once a month, the average value of the respective average identification rates for a month of the banknote processing apparatuses 2a to 2n recorded in the memory section 13, as the monthly average identification rate of the banknote processing apparatuses 2a to 2n as a whole. Note that the control section 11 of the banknote monitoring apparatus 1 calculates the monthly average identification rate of the banknote processing apparatuses 2a to 2n using a predetermined number or more of the average identification rates so as to improve the accuracy of the monthly average identification rate. In other words, the control section 11 of the banknote monitoring apparatus 1 calculates the monthly average identification rate of the banknote processing apparatuses 2a to 2n when the predetermined number or more of the average identification rates are recorded in the memory section 13.

The control section 11 of the banknote monitoring apparatus 1 determines whether the specification of the banknote has been changed after calculating the monthly average identification rate of the banknote processing apparatuses 2a to 2n (Step S5). For example, the control section 11 of the banknote monitoring apparatus 1 calculates the variation of the monthly average identification rates from the last month, and determines that the specification of the banknote has been changed when the absolute value of the calculated variation is greater than a predetermined threshold. When the control section 11 of the banknote monitoring apparatus 1 determines that the specification of the banknote has been changed, the communication section 12 transmits the specification change notification to the terminal device 3 by the control of the control section 11.

When the communication section 45 of the terminal device 3 receives the specification change notification transmitted from the banknote monitoring apparatus 1, the display 42 of the terminal device 3, for example, displays on the display 42 that the specification of the banknote has been changed, by the control of the control section 41 (Step S6).

As described above, the communication section 12 of the banknote monitoring apparatus 1 receives information on the identification results of the serial numbers (e.g., the average identification rates) transmitted from the plurality of banknote processing apparatuses 2a to 2n. The control section 11 calculates the identification rate of the serial numbers given to the banknotes (e.g., the monthly average identification rate) from a predetermined number or more of pieces of the information, and determines whether the specification of the banknote has been changed based on the identification rate. This processing enables the banknote monitoring apparatus 1 to detect that the specification of the banknote has been changed. For example, the banknote monitoring apparatus 1 can detect that the specification of the banknote has been changed when the absolute value of the variation of the monthly average identification rates in a month is greater than a predetermined threshold.

In addition, when the control section 11 detects that the specification of the banknote has been changed, the banknote monitoring apparatus 1 indicates to the terminal device 3 that the specification of the banknote has been changed, by the communication section 12. A user who owns the terminal device 3 can thus be aware that the specification of the banknote has been changed, and update the determination information for the banknote processing apparatuses 2a to 2n managed by the user, for example, to the determination information corresponding to a new banknote.

Further, the identification rate of the serial number is lowered when the specification of the banknote has been changed. When the identification rate of the serial number is lowered, the banknote processing apparatuses 2a to 2n stop the operation in some cases. With this regard, the user being aware that the specification of the banknote has been changed, can relax the matching condition (i.e., set a smaller threshold of the matching rate) for the serial number in the recognition units 25 of the banknote processing apparatuses 2a to 2n so that the banknote processing apparatuses 2a to 2n can continue operating until the determination information is updated.

(Variation 1)

In the above example, the control sections 21 of the banknote processing apparatuses 2a to 2n calculate the average identification rates of the serial numbers, and transmit the calculated average identification rates to the banknote monitoring apparatus 1, but the processing is not limited to this. The control sections 21 of the banknote processing apparatuses 2a to 2n may control the communication sections 29 to transmit the identification rates to the banknote monitoring apparatus 1 each time the recognition units 25 output the identification results of the serial numbers. The identification rates are calculated based on the outputted identification results. Alternatively, the control sections 21 of the banknote processing apparatuses 2a to 2n may record, in the memory sections 30, the identification results of the serial numbers outputted from the recognition units 25, and collectively transmit the identification rates to the banknote monitoring apparatus 1 in a predetermined cycle (e.g., at a predetermined time once a day). The identification rates are calculated based on the identification results recorded in the memory sections 30.

In this case, the control section 11 of the banknote monitoring apparatus 1 records the identification rates transmitted from the banknote processing apparatuses 2a to 2n in the memory section 13. The control section 11 of the banknote monitoring apparatus 1 calculates the average value of the identification rates recorded in the memory section 13 in a predetermined cycle (e.g., on a predetermined date and time once a month). The control section 11 of the banknote monitoring apparatus 1 then determines whether the specification of the banknote has been changed based on the calculated average value of the identification rates.

This also enables the banknote monitoring apparatus 1 to detect that the specification of the banknote has been changed, and moreover, reduce a processing load of calculating the average identification rates in the banknote processing apparatuses 2a to 2n.

(Variation 2)

The communication sections 29 of the banknote processing apparatuses 2a to 2n may transmit the identification results of the serial numbers subjected to matching processing of the recognition units 25, to the banknote monitoring apparatus 1 based on the control of the control sections 21. Then, the control section 11 of the banknote monitoring apparatus 1 may calculate the monthly average identification rate of the serial numbers based on the identification results of the serial numbers transmitted from the banknote processing apparatuses 2a to 2n.

For example, in a case where the recognition unit 25 of the banknote processing apparatus 2a fails to identify the 4th digit and the 6th digit of a serial number of 10 digits "0987654321" on a banknote, the recognition unit 25 of the banknote processing apparatus 2a outputs "098*6*4321" to the control section 21 as an identification result of the identified serial number. Note that "*" indicates that the character of the serial number is unidentified. Each character of the identification result may also be text data.

The communication section 29 of the banknote processing apparatus 2a transmits the identification result "098*6*4321" obtained by the control section 21, to the banknote monitoring apparatus 1. The control section 11 of the banknote monitoring apparatus 1 calculates the identification rate of the serial number from the identification result "098*6*4321" transmitted from the banknote processing apparatuses 2a. Since 8 digits of the number "09864321" among 10 digits of the serial number "098*6*4321" are identified, the control section 11 of the banknote monitoring apparatus 1 calculates the identification rate of "80%". The control section 11 of the banknote monitoring apparatus 1 records the calculated identification rate in the memory section 13, and calculates the monthly average identification rate at a predetermined time once a month, for example.

As described above, the banknote processing apparatuses 2a to 2n may transmit the identification results of the serial numbers to the banknote monitoring apparatus 1, and the banknote monitoring apparatus 1 may calculate the identification rates of the serial numbers based on the identification results of the serial numbers transmitted from the banknote processing apparatuses 2a to 2n. This also enables the banknote monitoring apparatus 1 to detect that the specification of the banknote has been changed.

Note that the recognition units 25 of the banknote processing apparatuses 2a to 2n may generate image data of the banknote and output the image data to the control sections 21 when not identifying even 1 digit of the character in the serial number. The communication sections 29 of the banknote processing apparatuses 2a to 2n may transmit the image data of the banknote and the identification result corresponding to the image data of the banknotes, to the banknote monitoring apparatus 1 based on the control of the control sections 21. The control section 11 of the banknote monitoring apparatus 1 may record, in the memory section 13, the image data of the banknote and the identification result corresponding to the image data of the banknote transmitted from the banknote processing apparatuses 2a to 2n, while associating the image data with the identification result. When the control section 11 of the banknote monitoring apparatus 1 determines that the specification of the banknote has been changed, the image data of the banknote and the identification result recorded in the memory section 13 may be transmitted to the terminal device 3 with the specification change notification.

This enables a user received the image data on the terminal device 3 to generate new determination information corresponding to a revised banknote based on the image data since it is highly possible that the specification of the banknote in the received image data has been changed. In addition, the control sections 21 of the banknote processing apparatuses 2a to 2n can reduce communication traffic by filtering the image data to be transmitted to the banknote monitoring apparatus 1 (i.e., by transmitting no image data of a banknote with the serial number including characters that are all identified).

(Variation 3)

The recognition units 25 of the banknote processing apparatuses 2a to 2n may output the image data of the unidentified banknote to the control sections 21 when not identifying even 1 digit of the character in the serial number. The communication sections 29 of the banknote processing apparatuses 2a to 2n may then transmit, by the control of the control sections 21, the image data of the banknote outputted from the recognition units 25 to the banknote monitoring apparatus 1. The control section 11 of the banknote monitoring apparatus 1 may record, in the memory section 13, the image data transmitted from the banknote processing apparatuses 2a to 2n.

When the control section 11 of the banknote monitoring apparatus 1 determines that the specification of the banknote has been changed, the image data of the banknote recorded in the memory section 13 may be transmitted to the terminal device 3 with the specification change notification. This enables a user received the image data using the terminal device 3 to generate new determination information corresponding to a banknote with a changed specification (a revised banknote) based on the received image data.

Note that, although the recognition units 25 of the banknote processing apparatuses 2a to 2n above output the image data of the unidentified banknote to the control sections 21 when not identifying even 1 digit of the character in the serial number, the processing is not limited to this. For example, the recognition units 25 of the banknote processing apparatuses 2a to 2n may output the image data of the unidentified banknote to the control sections 21 when not identifying characters in a predetermined number or more of the digits (e.g., 3 digits or more) of the serial number. The communication sections 29 of the banknote processing apparatuses 2a to 2n may then transmit, by the control of the control sections 21, the image data of the banknote transmitted from the recognition units 25 to the banknote monitoring apparatus 1.

Further, the control section 11 of the banknote monitoring apparatus 1 may generate the determination information for the banknote processing apparatuses 2a to 2n based on the image data recorded in the memory section 13 when determining that the specification of the banknote has been changed. The communication section 12 of the banknote monitoring apparatus 1 may transmit, by the control of the control section 11, the generated determination information to the banknote processing apparatuses 2a to 2n with the specification change notification.

(Variation 4)

The control sections 21 of the banknote processing apparatuses 2a to 2n may calculate the average identification rate using the identification rates when no errors occur related to the banknote recognition. For example, when the recognition units 25 have errors (e.g., sensor errors), the control sections 21 of the banknote processing apparatuses 2a to 2n do not use the identification rates of the serial numbers outputted from the recognition units 25 for calculating the average identification rate. Meanwhile, when the recognition units 25 have no errors (e.g., sensor errors), the control sections 21 of the banknote processing apparatuses 2a to 2n calculate the average identification rate using the identification rates of the serial numbers outputted from the recognition units 25. The communication sections 29 of the banknote processing apparatuses 2a to 2n may then transmit, to the banknote monitoring apparatus 1, the average identification rate calculated using the identification rates when no errors occur related to the banknote recognition.

As described above, the banknote monitoring apparatus 1 can improve the accuracy of determining the specification change of the banknote by determining whether the specification of the banknote has been changed using information when no errors occur related to the banknote recognition.

Note that the communication sections 29 of the banknote processing apparatuses 2a to 2n may transmit, to the banknote monitoring apparatus 1, the identification rates or the identification results when no errors occur related to the banknote recognition.

(Variation 5)

As described in Variation 2 or Variation 3, the banknote monitoring apparatus 1 records, in the memory section 13, the image data of the banknote transmitted from the banknote processing apparatuses 2a to 2n, for example. The control section 11 of the banknote monitoring apparatus 1 calculates the variation of the average identification rates for a predetermined period (e.g., the monthly average identification rate), and when the absolute value of the variation of the calculated identification rates is greater than a predetermined threshold, the control section 11 may analyze the image of the image data recorded in the memory section 13. For example, the control section 11 of the banknote monitoring apparatus 1 may analyze a font or a color of the serial number, or design patterns of the background of the serial number included in the image data. Then the banknote monitoring apparatus 1 may transmit the analysis information to the terminal device 3 when transmitting the specification change notification to the terminal device 3.

This enables a user received the analysis information using the terminal device 3 to easily generate new determination information corresponding to a revised banknote based on the received analysis information.

Note that the banknote monitoring apparatus 1 may transmit, to the terminal device 3, information indicating that the absolute value of the variation of the identification rates is greater than the predetermined threshold, in addition to or in place of the analysis information of the image data. In this case, the user received the information using the terminal device 3 can easily be aware that the specification of the banknote has been changed, and update the determination information for the managing banknote processing apparatuses 2*a* to 2*n* to the determination information corresponding to a new banknote, for example.

(Variation 6)

When at least one of the characters composing the serial number is unidentified, the control section 11 of the banknote monitoring apparatus 1 may record, in the memory section 13, the serial number including at least one unidentified character, and digit information of the unidentified character in association with each other. The memory section 13 also serves as a digit information memory section in this case. Note that the serial number including at least one unidentified character and the digit information of the unidentified character may also be recorded in association with each other in a digit information memory section different from the memory section 13.

When the identification result transmitted from one of the banknote processing apparatuses 2*a* to 2*n* is "098*654*21", for example, the control section 11 of the banknote monitoring apparatus 1 records, in the memory section 13, the identification result of the serial number "098*654*21" and the digit information of the unidentified characters "the 4th digit" and "the 8th digit" in association with each other.

The communication section 12 of the banknote monitoring apparatus 1 may transmit the digit information of the unidentified character in the serial number to the terminal device 3 when transmitting the specification change notification by the control of the control section 11. This enables a user received the digit information of the unidentified character in the serial number using the terminal device 3 to inspect, for example, a design change around the digit of the serial number indicated in the digit information, and to early generate new determination information corresponding to a revised banknote.

(Variation 7)

The control section 11 of the banknote monitoring apparatus 1 may record, in the memory section 13, the average identification rates and information on installed locations (e.g., longitude and latitude) of the banknote processing apparatuses 2*a* to 2*n* transmitting the average identification rates, while associating the average identification rates with the installed location information. The memory section 13 serves as a location information memory section in this case. Note that the average identification rates and the information on the installed locations of the banknote processing apparatuses 2*a* to 2*n* transmitting the average identification rates may also be recorded, by the control section 11 of the banknote monitoring apparatus 1, in association with each other in a location information memory section different from the memory section 13. The control section 11 of the banknote monitoring apparatus 1 may then calculate the monthly average identification rate for each area. Note that the information on the installed location of the banknote processing apparatus 2*a* may be transmitted with the average identification rates to the banknote monitoring apparatus 1 from the banknote processing apparatus 2*a*, or may be recorded in the memory section 13 of the banknote monitoring apparatus 1 on the registration with the banknote monitoring service.

For example, it is assumed here that there are an area with a greater absolute value of the variation of the monthly average identification rates of the serial numbers and an area with a smaller absolute value thereof, and the area with the greater absolute value of the variation of the monthly average identification rates is in an urban area where a bank of issue is located. In this case, when the absolute value of the variation of the monthly average identification rates in the urban area where the bank of issue is located exceeds a predetermined value, it is highly possible that the banknote has been revised even in a case where the absolute value of the variation of the monthly average identification rates for the entire banknote processing apparatuses 2*a* to 2*n* does not exceed the predetermined value, for example. This is because revised banknotes are considered to be gradually circulated from the area of the bank of issue. Thus, the control section 11 of the banknote monitoring apparatus 1 determines that the specification of the banknote has been changed when the absolute value of the variation of the monthly average identification rates in the urban area where the bank of issue is located exceeds the predetermined value even in the case where the absolute value of the variation of the monthly average identification rates for the entire banknote processing apparatuses 2*a* to 2*n* does not exceed the predetermined value.

As described above, the banknote monitoring apparatus 1 can accurately detect that the specification of the banknote has been changed by recording, in the memory section 13, the serial number unidentified by the banknote processing apparatuses 2*a* to 2*n* and the information on the installed locations of the banknote processing apparatuses 2*a* to 2*n* that have processed the banknote with the unidentified serial number, while associating the unidentified serial number and the installed location information.

Further, the absolute value of the variation of the monthly average identification rate for the entire banknote processing apparatuses 2*a* to 2*n* exceeds the predetermined value when, for example, the banknotes with a specification change are circulated to cities in areas other than the urban area where the bank of issue is located. The banknote monitoring apparatus 1, however, determines that the specification of the banknote has been changed when the absolute value of the variation of the monthly average identification rates in the urban area where the bank of issue is located exceeds the predetermined value even in the case where the absolute value of the variation of the monthly average identification rate for the entire banknote processing apparatuses 2*a* to 2*n* does not exceed the predetermined value. This enables the banknote monitoring apparatus 1 to early indicate to the user that the specification of the banknote has been changed.

Note that the control section 11 of the banknote monitoring apparatus 1 may record, in the memory section 13, the identification rates and the information on the installed locations of the banknote processing apparatuses 2*a* to 2*n* transmitting the identification rates, while associating the identification rates with the installed location information. The control section 11 of the banknote monitoring apparatus 1 may also record, in the memory section 13, the identification results and the information on the installed locations of the banknote processing apparatuses 2a to 2n transmitting the identification results, while associating the identification results with the installed location information.

(Variation 8)

The communication sections 29 of the banknote processing apparatuses 2a to 2n may transmit the image data of the banknote obtained by the recognition units 25 to the banknote monitoring apparatus 1 by the control of the control sections 21. The control section 11 of the banknote monitoring apparatus 1 may calculate the identification rate of the serial number from the image data transmitted from the banknote processing apparatuses 2a to 2n. The control section 11 of the banknote monitoring apparatus 1 may analyze the image data of the banknote including the unidentified serial number when the calculated identification rate (the average identification rate) of the serial number is a predetermined value or lower. For example, the control section 11 of the banknote monitoring apparatus 1 may analyze the font of the serial number or the like. The control section 11 of the banknote monitoring apparatus 1 may then transmit an analysis result of the image data to the terminal device 3. This enables the user received the analysis result on the terminal device 3 to early generate the determination information of the banknote.

(Variation 9)

The communication sections 29 of the banknote processing apparatuses 2a to 2n may transmit the image data of the banknote obtained by the recognition units 25 to the banknote monitoring apparatus 1 by the control of the control sections 21. The control section 11 of the banknote monitoring apparatus 1 may calculate the identification rate of the serial number from the image data transmitted from the banknote processing apparatuses 2a to 2n. The control section 11 of the banknote monitoring apparatus 1 may determine that the serial number is identified when the characters composing the serial number are all identified from the image data, and may determine that the serial number is unidentified when at least one of the characters composing the serial number is unidentified from the image data. The control section 11 of the banknote monitoring apparatus 1 then calculates a rate of the number of determination that the serial number is unidentified to the number of determination that the serial number is identified, and may determine whether the specification of the banknote has been changed from the calculated rate. The control section 11 of the banknote monitoring apparatus 1 may calculate the above rate in a predetermined cycle (e.g., at a predetermined time once a month). This also enables the banknote monitoring apparatus 1 to detect that the specification of the banknote has been changed.

(Variation 10)

The communication sections 29 of the banknote processing apparatuses 2a to 2n may transmit information on the fitness of the banknote in addition to the average identification rates to the banknote monitoring apparatus 1 by the control of the control sections 21. The control section 11 of the banknote monitoring apparatus 1 may record, in the memory section 13, the information on the fitness of the banknote transmitted from the banknote processing apparatuses 2a to 2n.

The control section 11 of the banknote monitoring apparatus 1 may calculate a rate of unfit notes to fit notes from the information on the fitness of the banknote recorded in the memory section 13 when determining whether the specification of the banknote has been changed. When the rate of unfit notes is greater than a predetermined threshold, the control section 11 of the banknote monitoring apparatus 1 may determine that the specification of the banknote has not been changed even in a case where the absolute value of the variation of the monthly identification rates of the banknotes is greater than a predetermined value. This is because what has caused the absolute value of the variation of the identification rates of the banknotes to be greater than a predetermined value is not the specification change of the banknote but more likely an influence of the unfit notes.

Note that, when the banknote processing apparatuses 2a to 2n are installed, for example, in a place collecting unfit notes (e.g., a cash center), the control section 11 of the banknote monitoring apparatus 1 need not record, in the memory section 13, the fitness information of the banknote processing apparatuses 2a to 2n installed in the place collecting unfit notes. This is because the rate of unfit notes is naturally high when the rate is calculated from the fitness information of the banknote processing apparatuses 2a to 2n installed in the place collecting unfit notes.

Further, the communication sections 29 of the banknote processing apparatuses 2a to 2n may also transmit, for example, the transmission date and time or information of customers who have deposited the banknote to the banknote monitoring apparatus 1, when transmitting the fitness information of the banknote.

(Variation 11)

The communication sections 29 of the banknote processing apparatuses 2a to 2n may transmit, in a predetermined cycle, temperature information indicating temperature inside the banknote processing apparatuses 2a to 2n, to the banknote monitoring apparatus 1 by the control of the control sections 21. The control section 11 of the banknote monitoring apparatus 1 may record, in the memory section 13, the temperature information transmitted from the banknote processing apparatuses 2a to 2n.

When the average identification rates of the serial numbers vary with the temperature in the temperature information recorded in the memory section 13, the control section 11 of the banknote monitoring apparatus 1 may determine that the identification rate in OCR of the banknote processing apparatuses 2a to 2n varies depending on the temperature. The control section 11 of the banknote monitoring apparatus 1 may indicate the determination to the terminal device 3 when determining that the identification rate in OCR of the banknote processing apparatuses 2a to 2n varies depending on the temperature.

This enables a user to receive, using the terminal device 3, the information indicating the identification rate in OCR varies depending on the temperature, and to correct a temperature characteristic of OCR of the banknote processing apparatuses 2a to 2n. In addition, the correction of the temperature characteristic allows OCR to obtain accurate identification rates.

(Variation 12)

The control sections 21 of the banknote processing apparatuses 2a to 2n may calculate an average value of the matching rates in a predetermined cycle, e.g., once a day, and the communication sections 29 may transmit the calculation result to the banknote monitoring apparatus 1. The control section 11 of the banknote monitoring apparatus 1 may calculate a monthly average value of the matching rates in a predetermined cycle, e.g., once a month. The control section 11 of the banknote monitoring apparatus 1 may determine whether the specification of the banknote has been changed based on the calculated matching rate. For example, the control section 11 of the banknote monitoring apparatus 1 may determine that the specification of the banknote has been changed when an absolute value of a variation of the calculated matching rates per predetermined period exceeds a predetermined value.

(Variation 13)

When the determination information is updated, the communication sections 29 of the banknote processing apparatuses 2a to 2n may transmit the version information of the determination information to the banknote monitoring apparatus 1 by the control of the control sections 21.

The control section 11 of the banknote monitoring apparatus 1 may determine whether the average identification rate is less than a predetermined threshold for each of the banknote processing apparatuses 2a to 2n. The communication section 12 of the banknote monitoring apparatus 1 may transmit, by the control of the control section 11, the determination that the average identification rate is less than the predetermined threshold and the version information of the determination information to the terminal device 3 owned by a user managing the banknote processing apparatuses 2a to 2n in which the average identification rate is less than the predetermined threshold. This enables the user to realize that one of the reasons for deterioration of the average identification rate of the banknote processing apparatuses 2a to 2n is an old version of the determination information, for example.

Note that the communication sections 29 of the banknote processing apparatuses 2a to 2n may transmit model information of the banknote processing apparatuses 2a to 2n to the banknote monitoring apparatus 1. In the same manner as transmitting the version of the determination information, the communication section 12 of the banknote monitoring apparatus 1 may transmit, by the control of the control section 11, the determination that the identification rate is less than the predetermined threshold and the model information of the banknote processing apparatuses 2a to 2n to the terminal device 3 owned by a user managing the banknote processing apparatuses 2a to 2n in which the identification rate is less than the predetermined threshold.

(Variation 14)

The communication sections 29 of the banknote processing apparatuses 2a to 2n may transmit image data of the banknote with the serial number unidentified by the recognition units 25, to the banknote monitoring apparatus 1 by the control of the control sections 21. At this time, control sections 21 of the banknote processing apparatuses 2a to 2n may filter the image data to be transmitted.

For example, the communication sections 29 of the banknote processing apparatuses 2a to 2n may transmit the image data of the banknote with the serial number including a predetermined number or more of unidentified digits, to the banknote monitoring apparatus 1 by the control of the control sections 21. Further the communication sections 29 of the banknote processing apparatuses 2a to 2n may transmit, to the banknote monitoring apparatus 1 by the control of the control sections 21, the image data of the banknote with the serial number including a predetermined number or more of the digits, the matching rate of which is a predetermined value or less. This enables the banknote processing apparatuses 2a to 2n to prevent communication traffic from increasing.

Note that the control sections 21 of the banknote processing apparatuses 2a to 2n may record, in the memory section 30, the image data of the banknote with the serial number unidentified by the recognition units 25. The communication sections 29 of the banknote processing apparatuses 2a to 2n may then transmit the image data recorded in the memory section 30 to the banknote monitoring apparatus 1 by the control of the control sections 21 in response to the request from the banknote monitoring apparatus 1. Additionally, the communication sections 29 of the banknote processing apparatuses 2a to 2n may transmit the image data recorded in the memory section 30 to the banknote monitoring apparatus 1 in response to an operation of a user.

(Variation 15)

The communication sections 29 of the banknote processing apparatuses 2a to 2n may transmit, to the banknote monitoring apparatus 1 by the control of the control sections 21, various information such as installed locations of the banknote processing apparatuses 2a to 2n, a model of the apparatus, a version of determination information, transaction information (information on deposits and withdrawals), client information, an operation form of the banknote processing apparatuses 2a to 2n (e.g., for retail, cash vaults, self-service, and semi-self-service), banknote processing time, daily temperature, and daily humidity. The control section 11 of the banknote monitoring apparatus 1 may obtain trends in the information from the various information (big data) received from the banknote processing apparatuses 2a to 2n, and provide a user with analysis results interpreted from the trends in the obtained information.

FIG. 8 is a chart for describing examples of trends in information in each parameter, and analysis results interpreted from the trends in the information. It is assumed here that ink of the serial number on a certain banknote has been changed. The serial number is printed on a certain background.

The control section 11 of the banknote monitoring apparatus 1 can obtain the analysis results (possibilities) as described in FIG. 8 from the trends in the information (trends seen in big data) in each parameter as described in FIG. 8.

Note that the control section 11 of the banknote monitoring apparatus 1 may determine that the ink of the serial number is more likely to be changed in seeing the analysis results underlined with solid lines in FIG. 8 in combination with a plurality of the parameters. Meanwhile, the control section 11 of the banknote monitoring apparatus 1 may determine that the ink of the serial number is unlikely to be changed in seeing the analysis results underlined with broken lines in combination with a plurality of the parameters. The control section 11 of the banknote monitoring apparatus 1 cannot determine whether the ink of the serial number is changed in seeing the analysis results without underlines in combination with a plurality of the parameters.

(Variation 16)

The control section 41 of the terminal device 3 may access the banknote monitoring apparatus 1, and obtain information collected by the banknote monitoring apparatus 1, in response to an operation of a user. For example, the control section 41 of the terminal device 3 may obtain the monthly average identification rate as illustrated in FIG. 2 or the information as described in FIG. 8, and display the obtained information on the display 42.

(Variation 17)

The communication sections 29 of the banknote processing apparatuses 2a to 2n may transmit, to the banknote monitoring apparatus 1 by the control of the control sections 21, information of the serial numbers read by the recognition units 25 and identification accuracy data of the information of the read serial numbers. The information of the serial numbers read by the recognition units 25 may be, for example, image data or text data.

The identification accuracy data is information (flag information) indicating whether a character in each digit of the serial number read by the recognition unit 25 is read with a predetermined matching rate (threshold) or higher. For example, it is assumed that the recognition unit 25 reads the serial number "0967654321" from the banknote, and the matching rate of the character in the 3rd digit of the serial number is less than a predetermined threshold whereas the matching rates of the characters in the other digits of the serial number are the predetermined threshold or higher. In this case, the identification accuracy data is represented by "0010000000". The number "0" in the identification accuracy data indicates that the matching rate of the character in the corresponding digit is the predetermined threshold or higher. The number "1" in the identification accuracy data indicates that the matching rate of the character in the corresponding digit is less than the predetermined threshold.

The communication section 12 of the banknote monitoring apparatus 1 receives the information of the serial numbers and the identification accuracy data transmitted from the banknote processing apparatuses 2a to 2n. The control section 11 of the banknote monitoring apparatus 1 calculates the identification rates of the serial numbers from the identification accuracy data transmitted from the banknote processing apparatuses 2a to 2n. For example, the control section 11 of the banknote monitoring apparatus 1 calculates a rate of the number of digits read with a predetermined matching rate or higher to the number of digits of the serial number. To be more specific, the identification accuracy data is "0010000000" in the above example of the serial number "0967654321", which indicates that the serial number is read with the predetermined matching rate or higher for characters in 9 digits among 10 digits excluding the 3rd digit, and thus the control section 11 of the banknote monitoring apparatus 1 calculates the identification rate of the serial number "0967654321" as 90%.

The control section 11 of the banknote monitoring apparatus 1 determines the specification change of the banknote using the calculated identification rates. The control section 11 of the banknote monitoring apparatus 1 determines the specification change of the banknote by, for example, calculating the monthly identification rate of the calculated identification rates.

Note that the communication sections 29 of the banknote processing apparatuses 2a to 2n transmit the information of the serial number and the identification accuracy data above, but the processing is not limited to this. The communication sections 29 of the banknote processing apparatuses 2a to 2n may transmit the identification accuracy data without transmitting the information of the serial number. Further, when the communication section 12 of the banknote monitoring apparatus 1 receives the information of the serial number and the identification accuracy data transmitted from the banknote processing apparatuses 2a to 2n, the control section 11 may record, in the memory section 13, the information of the serial number and the identification accuracy data in association with each other.

(Variation 18)

In FIG. 3, the control section 11 of the banknote monitoring apparatus 1 determines the specification change of the banknote for each country, but is not limited to operate this way. For example, some banknotes such as dollar notes are used across countries. The control section 11 of the banknote monitoring apparatus 1 may thus determine the specification change of the banknote circulated in a plurality of countries, for example, based on the average identification rates transmitted from the banknote processing apparatuses 2a to 2n installed in the plurality of countries. Then, the communication section 12 of the banknote monitoring apparatus 1 may transmit, by the control of the control section 21, the specification change notification to users of the banknote processing apparatuses 2a to 2n that process the banknote circulated in the plurality of countries.

Note that the control section 11 of the banknote monitoring apparatus 1 can perform the following analysis on the banknote circulated in the plurality of countries. For example, the banknote circulated in the plurality of countries is a banknote of a country A and issued in a bank of issue in the country A.

Analysis example 1: Case where the identification rate of the serial number is not lowered in the country A with the bank of issue whereas the identification rate of the serial number is lowered in a country B without the bank of issue, other than the country A.

In this case, the control section 11 of the banknote monitoring apparatus 1 may determine that the banknote processing apparatuses 2a to 2n in the country B use an old version of determination information or an old version of hardware. The control section 11 of the banknote monitoring apparatus 1 may also determine that unfit notes (soiled notes) are widely circulated in the country B. Additionally, the control section 11 of the banknote monitoring apparatus 1 may determine that counterfeit notes are widely circulated in the country B.

Analysis example 2: Case where the identification rate of the serial number is lowered in the country A with the bank of issue whereas the identification rate of the serial number is not lowered in the country B without the bank of issue, other than the country A.

In this case, the control section 11 of the banknote monitoring apparatus 1 may determine that the specification of the banknote issued in the country A has been changed. The control section 11 of the banknote monitoring apparatus 1 may also determine that the banknote processing apparatuses 2a to 2n in the country A use an old version of determination information or an old version of hardware. Additionally, the control section 11 of the banknote monitoring apparatus 1 may determine that unfit notes (soiled notes) are widely circulated in the country A. Further, the control section 11 of the banknote monitoring apparatus 1 may determine that counterfeit notes are widely circulated in the country A.

The communication section 12 of the banknote monitoring apparatus 1 may transmit, by the control of the control section 21, an analysis result for the country A to the terminal device 3 owned by a user in the country A, and transmit an analysis result for the country B to the terminal device 3 owned by a user in the country B.

(Variation 19)

The control section 11 of the banknote monitoring apparatus 1 above determines whether the specification of the banknote has been changed by calculating the monthly average identification rate, but the determination method is not limited to this. For example, the control section 11 of the banknote monitoring apparatus 1 may calculate an average value of the average identification rates for a day (a daily average identification rate) transmitted from the banknote processing apparatuses 2a to 2n. The control section 11 of the banknote monitoring apparatus 1 may determine whether the specification of the banknote has been changed when an absolute value of a variation of the calculated daily average identification rates per predetermined period is greater than a predetermined threshold. The same applies to the matching rate described in Variation 12. Identification rate information on the identification rate (information used for the determination whether the specification of the banknote has been changed) may include, for example, the monthly average identification rate, the daily average identification rate, the monthly average value of the matching rate, or the daily average value of the matching rate.

The variations described above may be combined with each other.

This application is a continuation (in-part) of International Patent Application No. PCT/JP2019/035109, filed on Sep. 6, 2019, the disclosure of which is incorporated herein by reference in its entirety. International Patent Application No. PCT/JP2019/035109 is entitled to (or claims) the benefit of Japanese Patent Application No. 2018-185340, filed on Sep. 28, 2018, the disclosure of which is incorporated herein by reference in its entirety.

REFERENCE SIGNS LIST

1 Banknote monitoring apparatus
2a to 2n Banknote processing apparatus
3 Terminal device
4 Network
11, 21, 41 Control section
12, 29, 45 Communication section
13, 30, 46 Memory section
22 Inlet
23 Outlet
24 Transport unit
25 Recognition unit
26 Storage unit
27, 42 Display
28, 43 Operation unit
44 Audio output section

The invention claimed is:

1. A banknote monitoring apparatus, comprising:
a reception section that receives information including a serial number from each of a plurality of banknote processing apparatuses processing a banknote with the serial number; and
a control section that determines whether a specification of the banknote has been changed based on an identification rate of the serial number obtainable with the information received.

2. The banknote monitoring apparatus according to claim 1, wherein the information includes image data of the banknote with the serial number that has not been successfully identified by at least one of the plurality of banknote processing apparatuses that has transmitted the information.

3. The banknote monitoring apparatus according to claim 2, further comprising a memory section that records the serial number that has not been successfully identified and the image data of the banknote with this not successfully identified serial number in association with each other.

4. The banknote monitoring apparatus according to claim 1, wherein the control section determines whether the specification of the banknote has been changed by using the information received from at least one of the banknote processing apparatuses when the at least one of the banknote processing apparatuses has no error related to recognition of the banknote.

5. The banknote monitoring apparatus according to claim 1, wherein the control section determines whether the specification of the banknote has been changed based on a variation determined from the identification rate per predetermined period.

6. The banknote monitoring apparatus according to claim 5, wherein the control section determines that the specification of the banknote has been changed when an absolute value of the variation is greater than a predetermined threshold, and outputs information indicating that the absolute value of the variation is greater than the predetermined threshold.

7. The banknote monitoring apparatus according to claim 5, wherein the control section determines that the specification of the banknote has been changed when an absolute value of the variation is greater than a predetermined threshold, and analyzes an image of the banknote with the serial number that is not successfully identified.

8. The banknote monitoring apparatus according to claim 1, further comprising a digit information memory section that records, when at least one of characters composing the serial number is not successfully identified, the serial number including the at least one of characters that is not successfully identified and digit information of the at least one of characters that is not successfully identified, in association with each other.

9. The banknote monitoring apparatus according to claim 1, further comprising a location information memory section that records the information and information on an installed location of at least one of the plurality of banknote processing apparatuses that has transmitted the information, in association with each other, wherein the control section determines whether the specification of the banknote has been changed by using the information on the installed location.

10. A banknote monitoring apparatus according to claim 1, wherein the control section analyzes an image of the banknote with the serial number that is not successfully identified when the identification rate is equal to or lower than a predetermined threshold.

11. A banknote monitoring apparatus according to claim 1, wherein the control section determines that the serial number is successfully identified when characters composing the serial number are all successfully identified, and determines that the serial number is not successfully identified when at least one of the characters composing the serial number is not successfully identified.

12. A banknote monitoring system, comprising:
a plurality of banknote processing apparatuses that process a banknote with a serial number; and
a banknote monitoring apparatus comprising a reception section that receives information including the serial number from each of the plurality of banknote processing apparatuses, and a control section that determines whether a specification of the banknote has been changed based on an identification rate of the serial number obtainable with the information received by the reception section.

13. A banknote monitoring method, comprising:
receiving information including a serial number from each of a plurality of banknote processing apparatuses processing a banknote with the serial number; and
determining whether a specification of the banknote has been changed based on an identification rate of the serial number obtainable with the information received.

* * * * *